Dec. 21, 1954    R. H. ZEILMAN    2,697,644
BALL BEARING TURNTABLE
Filed Feb. 21, 1951
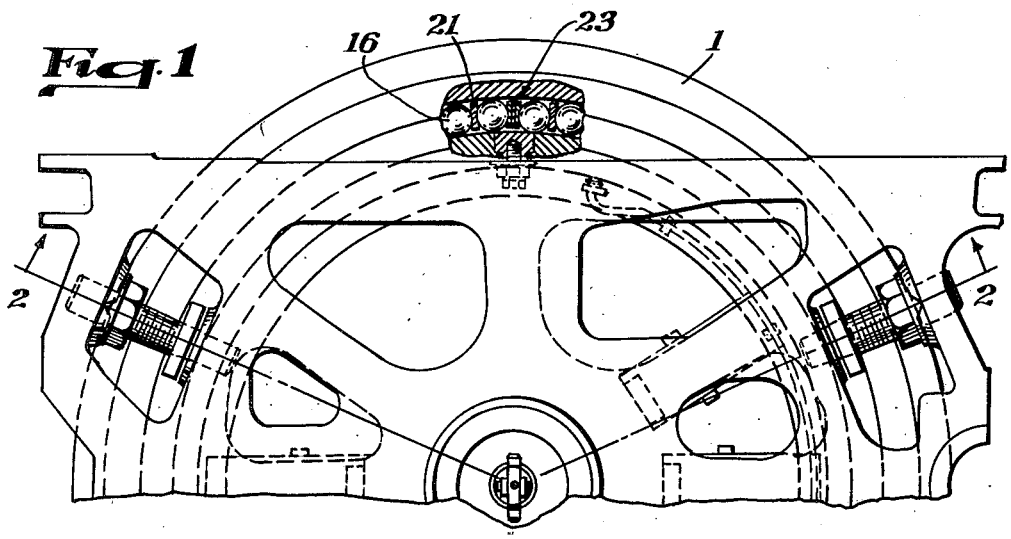
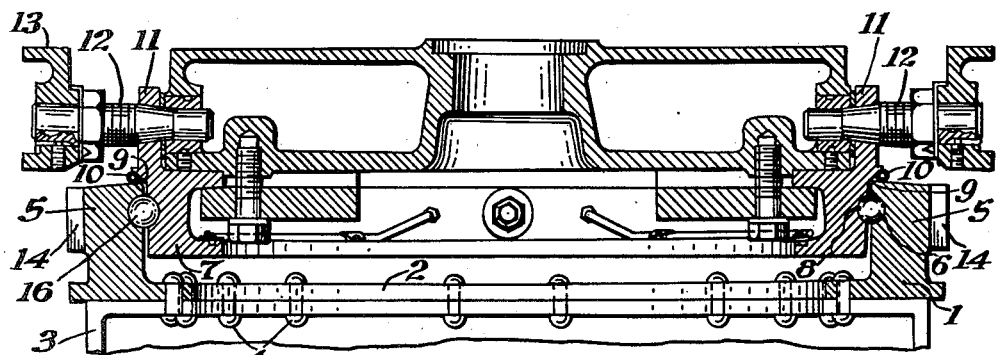
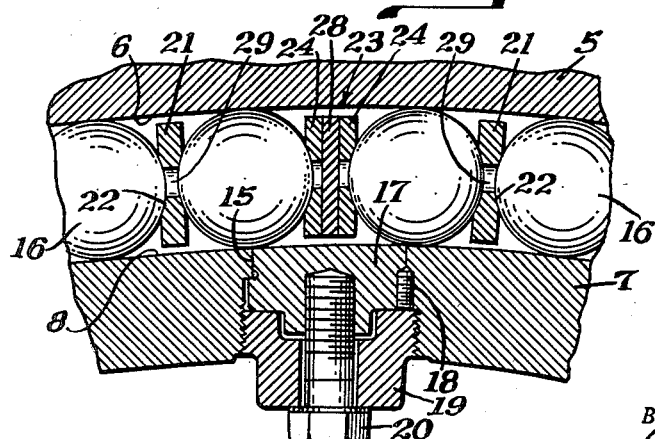
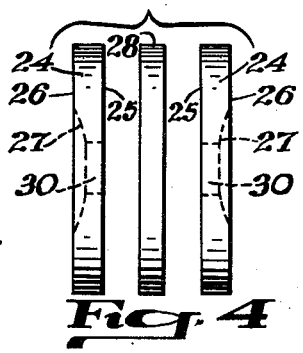
INVENTOR.
ROY H. ZEILMAN.
BY Oberlin & Limbach.
ATTORNEYS.

United States Patent Office 2,697,644
Patented Dec. 21, 1954

2,697,644

BALL BEARING TURNTABLE

Roy H. Zeilman, Elyria, Ohio, assignor to The Thew Shovel Company, Lorain, Ohio, a corporation of Ohio Application February 21, 1951, Serial No. 212,052

2 Claims. (Cl. 308—199)

This application relates as indicated to ball bearing turntables for cranes and like equipment, and more particularly to a ball bearing turntable unit having spacers between the balls provided to reduce friction in the unit to a minimum.

Conventional turntable constructions fall generally into two broad categories. The first of these comprises a pair of bearing rings having races which complement each other to provide a raceway for a plurality of balls employed to reduce friction between the respective bearing rings during rotation of the movable one of such rings into desired operating position. It is desirable that the balls be packed somewhat loosely in the raceway so as to permit freedom of rolling movement without unnecessary rubbing and sliding of the surfaces of adjacent balls against each other, since such rubbing or sliding action would produce increased friction and thereby greatly reduce the operating efficiency of the apparatus. Although thus to assemble the balls in the raceway in a loosely packed arrangement is effective greatly to reduce friction between adjacent balls, still such members are forced together as they pass into zones of load in the turntable raceway. Thus, where such assemblage is employed for excavators and cranes or the like, where the load on the bearing is not distributed uniformly therearound but is more or less concentrated in a zone adjacent the foot of the boom, the balls will be forced together and become pressed so tightly, one against the other upon entering such loaded zone, that they cannot individually freely rotate, but rub and slide and even wedge against each other, thus requiring additional power to operate the turntable. The loosely packed arrangement of the balls in the raceways has a disadvantage in that since the balls are forced together in the area outside of the loaded zone, clearance will occur between the balls in the loaded zone and undesirable movement of the raceways will result.

In order to overcome the disadvantages of the turntable assembly above described, it has been suggested to provide spacers disposed between adjacent balls having oppositely directed recessed faces which conform to the contour or shape of the balls and thus reduce the high friction created by the rubbing action of two adjacent balls in contact with each other. In the past such assemblages have been losely arranged in the raceway, for the simple reason that it was impracticable if not impossible to provide a tightly packed assemblage of balls and spacers. It will be apparent that were it attempted to provide a tightly packed series of balls and spacers in an annular raceway, it would be impossible to separate the assemblage sufficiently to insert the last spacer for example, since when fully inserted, the adjacent balls must fit tightly into the oppositely directed recessed portions of such spacer.

It is a primary object of this invention to provide a turntable bearing comprising a series of alternate balls and spacers which may be grouped together in a tightly packed assemblage to prevent other than rotative relative movement of the raceways.

It is a more specific object of this invention to provide, as at least one element of such assemblage, a spacer made up of sections which may be individually loaded into the raceway and thereby facilitate the assembly of a tightly packed bearing unit of balls and spacers.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a fragmentary top plan view of a ball bearing turntable unit having a portion thereof broken away in order to expose the arrangement of balls and spacers in the raceway and with the excavator or like assembly which may be secured to the rotatable element of the apparatus removed;

Fig. 2 is a vertical sectional view of the apparatus shown in Fig. 1 and taken substantially along the line 2—2 thereon;

Fig. 3 is an enlarged fragmentary top view in cross-section showing to advantage the balls and spacers as they are arranged in the turntable raceway and showing also the loading slot normally closed by means of a filler plug and through which such balls and spacers may be introduced into the raceway; and Fig. 4 is an exploded view of a spacer ball assembly provided between two adjacent balls of the bearing.

Broadly stated, this invention comprises a plurality of balls and spacers arranged alternately in a raceway, said spacers having recessed faces to receive adjacent balls, and at least one of the spacers comprising two members having oppositely directed recessed faces adapted to receive the adjacent balls, and means disposed between the two members operative unyieldably to spread apart said two members into tight engagement with the adjacent balls.

Referring now more particularly to Figs. 1 and 2 of the drawing, the turntable unit there shown may be seen to comprise a lower stationary element or base ring 1 which is provided with a suitable flange 2 at the bottom thereof for attachment to the excavator or truck frame 3 by means of rivets or bolts 4. Such base ring is provided with an annular upstanding flange 5 having formed therein of generally semi-circular cross-section a ball race 6 adjacent the upper extremity thereof and facing inwardly of the base ring.

Adapted to fit within the circular space provided by the annular flange 5 is a cooperating inner bearing ring 7 having a ball race 8 likewise of semi-circular cross-section formed on the outer periphery thereof and adapted to cooperate with the ball race 6. The upper joint 9 between the respective bearing rings is effectively sealed against the entrance of dirt and other undesirable matter by means of a gasket or sealing ring 10 secured in place about the entire periphery of the joint.

Said inner bearing ring is formed with an upwardly extending annular flange or web 11 to which is secured by means of tapered lock pins 12 the turntable bed 13 which may carry an excavator shovel or crane or the like. Said turntable bed will ordinarily be provided with a depending pinion (not shown) engageable with the gear rack 14 secured about the outer periphery of base ring 1 which may be driven by a suitable source of power to effect turning movement of the turntable bed relative to the stationary base ring 1.

Extending radially inwardly of the raceway and formed in inner bearing ring 7 is a loading slot 15 through which the balls 16 of the bearing assembly may be inserted. Such loading slot is normally closed by means of a cylindrical filler plug 17 inserted in such slot and doweled in place by means of member 18. Said filler plug may then desirably be held in place by means of a suitable lock nut assembly comprising, for example, a plug 19 threadedly secured to the inner bearing ring and a cap screw 20 extending through plug 19 and in threaded engagement with the filler plug 17.

As pointed out above, if the raceway is completely and tightly filled with balls, the resultant rubbing and sliding action between the contacting surfaces of adjacent balls will be such as to greatly reduce the operating efficiency of the apparatus. Similarly, if a loose assembly of balls is provided, then there will be a tendency for the balls to be forced toward each other upon entering the loaded zone and thus become so firmly wedged together that then cannot individually rotate as the turntable is rotated. In order to avoid this, I provide spacers generally indicated at 21 between the adjacent balls. Such spacers will be seen to be cylindrical in form having oppositely directed recessed faces. Such recesses are designated 22 and are spherical in form and substantially identical with the curvature of the balls so as to receive and uniformly contact the surfaces of the latter. Such spacers may be of any suitable anti-friction bearing material.

To load the raceway, the filler plug 17 and associated lock nut assembly is removed to permit the introduction, alternately and one by one, of the balls and spacers into the raceway. This process is ordinarily carried out very simply until the last spacer is to be inserted. Obviously, it would be impossible to insert a spacer having recessed faces between a pair of balls and end up with a tightly packed assembly of balls and spacers. This will be understood more clearly if, with reference to Fig. 3, it were attempted to disturb, that is, laterally displace, any one of the balls or spacers from the tightly packed bearing unit there shown. It would be impossible to laterally displace the spacer 21, for example, since the balls on either side are in contacting engagement with the recesses of such spacer and in substantially fixed spaced relation due to the tightly packed condition of the bearing. In order to avoid this obstacle and yet provide a tightly packed assembly of alternate balls and spacers, I have provided a sectional spacer member generally indicated 23 which may be inserted between a pair of adjacent balls piece by piece in order to afford a tight assemblage.

Such spacer 23 comprises two oppositely faced cylindrical elements 24 having opposed flat faces 25 and oppositely directed recessed faces 26 with spherical recesses 27 therein substantially identical with the recesses 22 of spacers 21, whereby to receive and uniformly contact the surfaces of the adjacent balls. Such spacer element 23 is, of course, intended to be inserted last into the raceway for that is the point at which difficulty is experienced in filling the raceway. After the spacer elements 24 have been properly inserted with their oppositely directed recessed faces contacting the surfaces of the adjacent balls, a third, flat-faced element or shim 28 is then inserted between the opposed flat faces of spacers 24 for the purpose of accurately and completely filling the space left in the raceway and thereby provide a completely tight assembly of balls and spacers.

The spacers, being substantially frictionless and providing a considerable contact area with the balls to afford a low unit pressure so as not to rupture the lubricant film therebetween, permit individual rotation of the balls at all times. The bearing may be packed with grease and since the construction is such that the bearing is effectively sealed, the grease will be retained therein for long periods so as thoroughly to lubricate the bearing and obviate the necessity of frequent repacking with grease.

An opening 29 extends axially through spacers 21 so as to provide a reservoir for grease which is continually spread upon the surface of the balls during operation of the turntable unit. Openings 30 are likewise formed axially through spacer elements 24 and for the same reason.

Thus it will be seen that I have provided a ball bearing turntable assembly comprising alternate balls and spacers which may be tightly packed together. It will be understood, of course, that more than one sectional spacer may be employed although more than one is ordinarily unnecessary. Likewise the spacers 21 as well as the sectional spacer 23 need not be cylindrical, although such configuration is desirable since it conforms with the cross-section of the raceway.

Other modes of applying the principle of the invention may be employed, change being made as regards the details described, provided the features stated in any of the following claims or the equivalent of such be employed.

I therefore particularly point out and distinctly claim as my invention:

1. A turntable assembly comprising two bearing rings having complementary ball races in their adjacent faces creating a substantially enclosed raceway, a plurality of balls in said raceway, spacers interposed between adjacent balls having recessed faces adapted to receive and engage the surface of said balls to provide a tight assembly of alternate balls and spacers, at least one of said spacers comprising two members having oppositely directed recessed faces adapted to receive and engage the surface of adjacent balls, a plate-like element disposed between said two members unyieldably spreading apart said two members into tight engagement with the adjacent balls, an opening in one of said rings through which said balls and spacers may be passed into said enclosed raceway and a plug member sealing said ring opening.

2. A turntable assembly comprising an outer bearing ring and an inner bearing ring carried upon a supporting frame in a horizontal plane, complementary ball races formed in the adjacent faces of said bearing rings creating a substantially enclosed raceway between said faces, a plurality of balls in said raceway, circular spacers interposed between adjacent balls having recessed faces adapted to receive and engage the surface of said balls to provide a tight assembly of alternate balls and spacers, said spacers being provided with openings which constitute lubricant reservoirs to maintain lubricant films between said spacers and said balls, at least one of said spacers comprising two members having oppositely directed recessed faces adapted to receive and engage the surface of adjacent balls, a circular plate disposed between said two members unyieldably spreading apart said two members into tight engagement with the adjacent balls, an opening in said inner ring through which said balls and spacers may be passed into said enclosed raceway and a plug member sealing said inner ring opening.

References Cited in the file of this patent

UNITED STATES PATENTS

| Number | Name | Date |
|---|---|---|
| 426,271 | Herman | Apr. 22, 1890 |
| 620,190 | Sharpneck | Feb. 28, 1899 |
| 1,261,154 | Newmann | Apr. 2, 1918 |
| 1,929,050 | Bender | Oct. 3, 1933 |
| 2,106,385 | Springer | Jan. 25, 1938 |

FOREIGN PATENTS

| Number | Country | Date |
|---|---|---|
| 20,372 | Great Britain | 1904 |